(12) United States Patent
Han et al.

(10) Patent No.: US 8,345,185 B2
(45) Date of Patent: Jan. 1, 2013

(54) COLOR MIXING LENS AND LIQUID CRYSTAL DISPLAY DEVICE HAVING THE SAME

(75) Inventors: Hae-Wook Han, Gyeongbuk (KR); Mee-Hyun Lim, Gyeongbuk (KR); Sung-Kyung Hwang, Daegu (KR); Min-Su Cho, Gyeonggi-do (KR); In-Jae Chung, Gyeonggi-do (KR); Sin-Ho Kang, Gyeonggi-do (KR); Kyeong-Kun Jang, Incheon (KR); Jae-Ho Lee, Daegu (KR)

(73) Assignees: Postech Academy—Industry Foundation, Gyeongbuk (KR); LG Display Co., Ltd., Seoul (KR)

( * ) Notice: Subject to any disclaimer, the term of this patent is extended or adjusted under 35 U.S.C. 154(b) by 212 days.

(21) Appl. No.: 12/909,408

(22) Filed: Oct. 21, 2010

(65) Prior Publication Data

US 2011/0096264 A1    Apr. 28, 2011

(30) Foreign Application Priority Data

Oct. 22, 2009   (KR) ..................... 10-2009-0100578

(51) Int. Cl.
*G02F 1/1335* (2006.01)
*F21V 5/00* (2006.01)
(52) U.S. Cl. ............. 349/62; 349/56; 349/106; 362/235
(58) Field of Classification Search .............. 349/56, 349/57, 61, 62, 68, 106, 107, 108; 362/235, 362/97.1, 97.2, 97.3, 97.4
See application file for complete search history.

(56) References Cited

U.S. PATENT DOCUMENTS

| | | | | |
|---|---|---|---|---|
| 7,476,015 | B2 * | 1/2009 | Arai et al. | 362/607 |
| 7,737,636 | B2 * | 6/2010 | Li et al. | 313/512 |
| 7,771,081 | B2 * | 8/2010 | Kim et al. | 362/235 |
| 8,089,583 | B2 * | 1/2012 | Li et al. | 349/65 |
| 2005/0259441 | A1 * | 11/2005 | Arai et al. | 362/613 |
| 2006/0198144 | A1 * | 9/2006 | Miyairi et al. | 362/257 |
| 2006/0291203 | A1 * | 12/2006 | Anandan | 362/231 |
| 2011/0096264 | A1 * | 4/2011 | Han et al. | 349/62 |

FOREIGN PATENT DOCUMENTS

| | | |
|---|---|---|
| CN | 101556402 A | 10/2009 |
| JP | 2007-018936 A | 1/2007 |

OTHER PUBLICATIONS

Chinese Office Action issued in a counterpart Chinese Patent Application No. 201010509832.8 dated Apr. 23, 2012.

* cited by examiner

*Primary Examiner* — Brian Healy
(74) *Attorney, Agent, or Firm* — Morgan, Lewis & Bockius LLP

(57) ABSTRACT

The present invention provides a color mixing lens which can improve color reproducibility, be made slim and adjust an emission pattern; and a liquid crystal display device having the same. The color mixing lens includes a light receiving portion having light receiving recesses which respectively house light emission diodes formed at a side surface thereof for positioning at least two light emission diodes at the side surface for producing color lights different from each other, a color mixing portion formed on the light receiving portion for mixing the lights from the light emission diodes into a white color light, and a light emission portion formed on the color mixing portion for emitting the white light from the color mixing portion through a top surface thereof.

13 Claims, 16 Drawing Sheets

Top

Middle

Bottom

COLOR MIXING LENS AND LIQUID CRYSTAL DISPLAY DEVICE HAVING THE SAME

CROSS REFERENCE TO RELATED APPLICATION

This application claims the benefit of the Korean Patent Application No. 10-2009-0100578, filed on Oct. 22, 2009, which is hereby incorporated by reference as if fully set forth herein.

BACKGROUND OF THE DISCLOSURE

1. Field of the Disclosure

The present invention relates to a color mixing lens which can improve color reproducibility, be made slim and adjust an emission pattern; and a liquid crystal display device having the same.

2. Discussion of the Related Art

In general, the liquid crystal display device, one of flat display device which displays an image by using liquid crystals, is used widely in industries general owing to advantages in that the liquid crystal display device is thinner, lighter and has a low driving voltage and a low power consumption compared to other flat display devices.

Since a liquid crystal panel of the liquid crystal display device provided for displaying the image is a non-light emission device which can not emit a light for itself, a light source for supplying the light is required.

As the light source, a white light emission diode that produces a white light is used. The white light emission diode is formed by coating red and green fluorescent layers on a surface of a blue light emission diode. Though fabrication is simple and a cost is low, the white light emission diode has disadvantages in that color uniformity, color reproducibility and light efficiency is poor.

In order to solve those problems, a technology is suggested, in which a white color is produced by using red, green and blue light emission diodes as light sources. That is, a red light, a green light and a blue light respectively emitted from the red, green and blue light emission diodes are mixed, to produce the white light. However, in order to mix the red light, the green light and the blue light respectively emitted from the red, green and blue light emission diodes, since a back light unit is required to have a thickness of 5~10 cm, and a plurality of optical sheets, such as diffusion film and so on are required, the technology has difficulty for using as the light source of the flat display device. Moreover, since it is required to drive the red, green and blue light emission diodes individually, controlling the light emission diodes is difficult.

SUMMARY OF THE DISCLOSURE

Accordingly, the present invention is directed to a color mixing lens and a liquid crystal display device having the same.

An object of the present invention is to provide a color mixing lens which can improve color reproducibility, be made slim and adjust an emission pattern; and a liquid crystal display device having the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a color mixing lens includes a light receiving portion having light receiving recesses which respectively house light emission diodes formed at a side surface thereof for positioning at least two light emission diodes at the side surface for producing color lights different from each other, a color mixing portion formed on the light receiving portion for mixing the lights from the light emission diodes into a white color light, and a light emission portion formed on the color mixing portion for emitting the white light from the color mixing portion through a top surface thereof.

The light receiving recess has a light incident surface positioned therein, which forms an acute angle to a horizontal axis and has a curvature.

The light receiving recess has a line width greater than a diameter of the light emission diode.

The color mixing lens further includes a light reflective layer formed on the light receiving portion, the color mixing portion and the light emission portion excluding the light incident surface of the light receiving portion positioned in the light receiving recess and the top surface of the light emission portion.

Or, alternatively, the color mixing lens further includes a light reflective layer formed on the light receiving recess excluding the light incident surface of the light receiving portion positioned in the light receiving recess, and a side surface of the light emission portion.

The color mixing lens further includes a light reflective layer formed on the light receiving recess excluding the light incident surface of the light receiving portion positioned in the light receiving recess, and the side surface of the light emission portion, and a light reflective structure formed to surround the light receiving portion and the color mixing portion in a state the light receiving portion except a portion connected to the light receiving recess of the light receiving portion and the color mixing portion are spaced from the light reflective structure.

The color mixing portion has a multiple layered structure in which at least one of the multiple layers has a sloped surface which has a width that becomes the smaller as a height thereof goes from a lower part to an upper part the more.

Or, alternatively, the color mixing portion has single layered structure which has a sloped surface which has a width that becomes the smaller as a height thereof goes from a lower part to an upper part the more.

The side surface of the light emission portion is formed to have a wave pattern with a depth which becomes the deeper as a height thereof goes from a lower part to an upper part.

The wave pattern is twisted in a direction of arrangement of light emission surfaces of the at least two light emission diodes, or in a direction opposite to a direction of arrangement of light emission surfaces of the at least two light emission diodes.

In another aspect of the present invention, a liquid crystal display device includes a color mixing lens for producing a white color light, and a liquid crystal panel for producing a picture by using the white color light produced from the color mixing lens, wherein the color mixing lens includes a light receiving portion having light receiving recesses which respectively house light emission diodes formed at a side surface thereof for positioning at least two light emission diodes at the side surface for producing color lights different from each other, a color mixing portion formed on the light receiving portion for mixing the lights from the light emission diodes into a white color light, and a light emission portion formed on the color mixing portion for emitting the white light from the color mixing portion through a top surface thereof.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
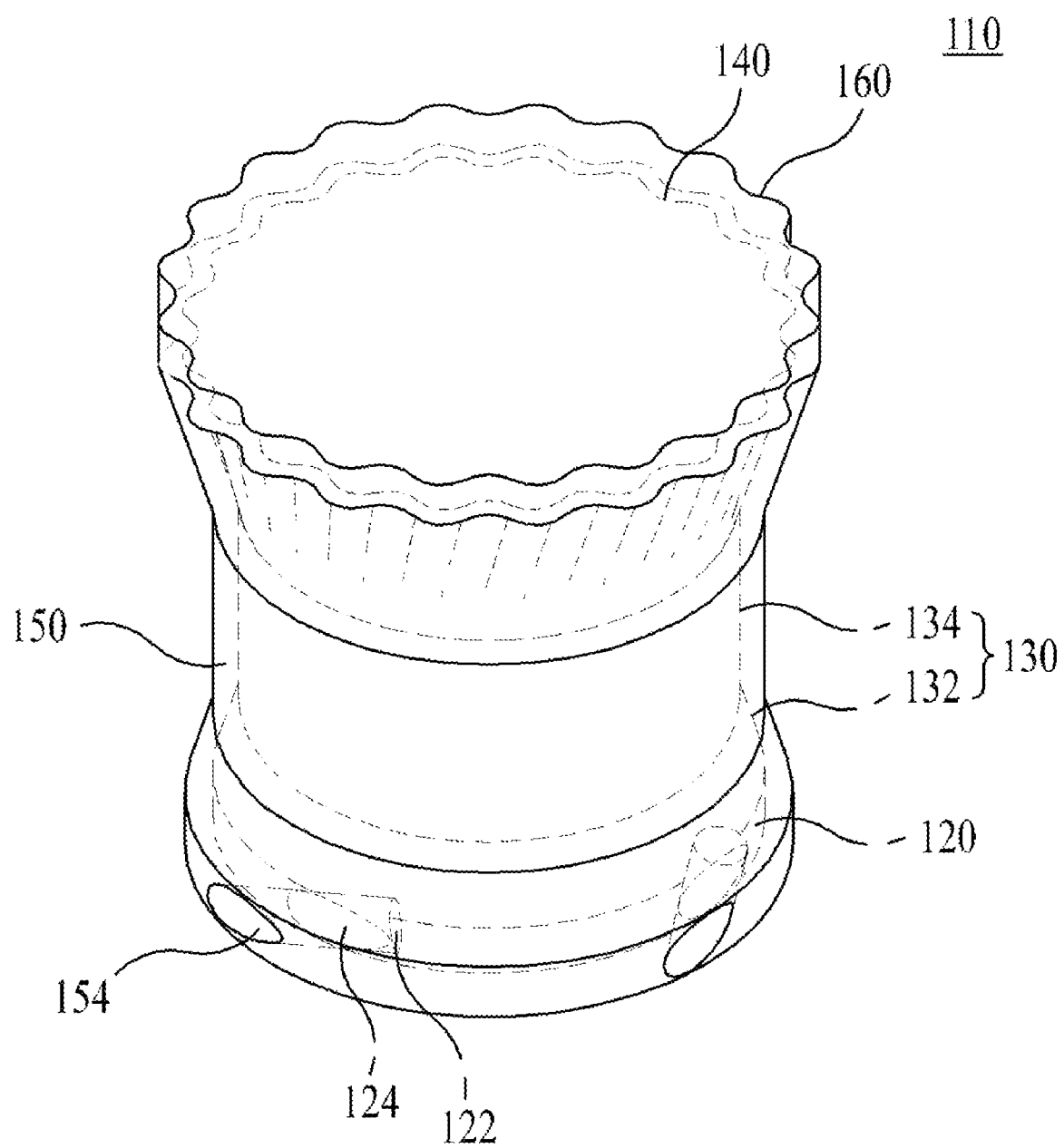
FIG. 1 illustrates a perspective view of a color mixing lens in accordance with a preferred embodiment of the present invention.

FIG. 1 illustrates a perspective view of a color mixing lens 110 in accordance with a preferred embodiment of the present invention, including a light receiving portion 120, a color mixing portion 130, a light emission portion 140, a light reflective layer 150, and a diffusion sheet 160.

Figure 2:
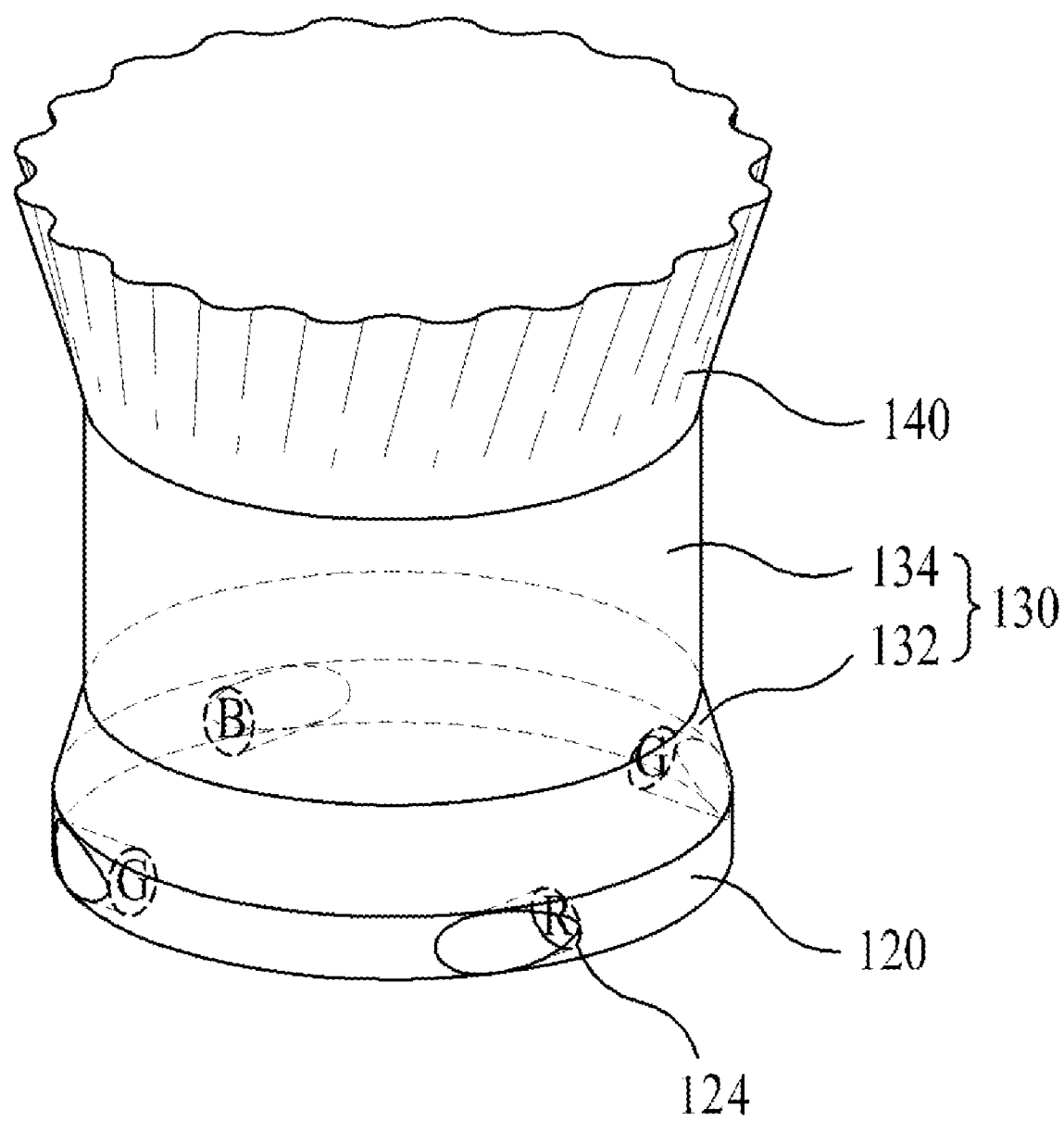
FIG. 2 illustrates a perspective view showing the color mixing lens in FIG. 1 in detail.

FIG. 2 illustrates a perspective view showing the light receiving portion 120, the color mixing portion 130 and the light emission portion 140 of the color mixing lens in FIG. 1 in detail.

Figure 3:
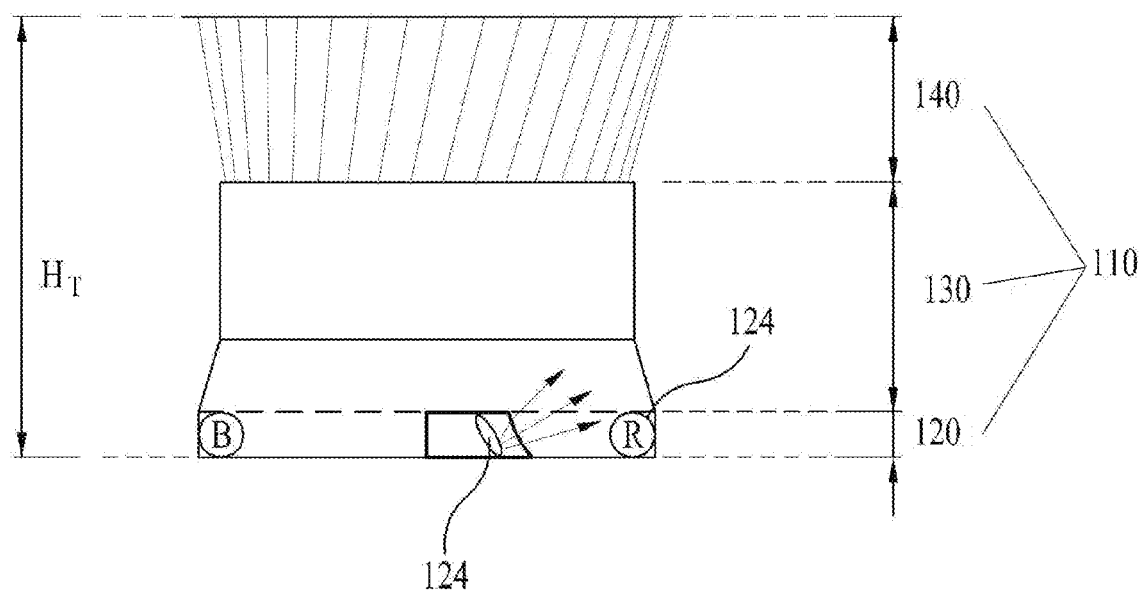
FIG. 3 illustrates a section of the color mixing lens in FIG. 1 in detail.
Figure 4A:
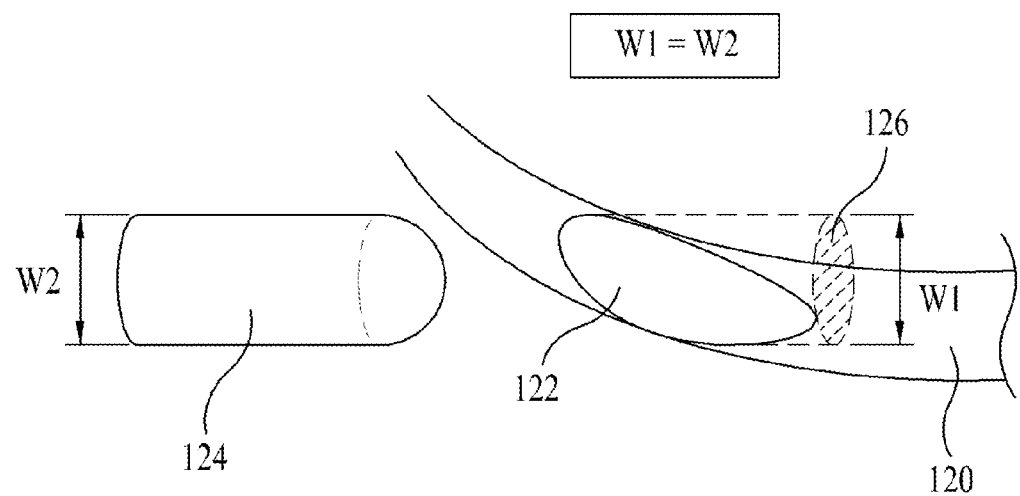
FIGS. 4A~4C illustrate diagrams each showing a variation of a light emission diode placed in the light receiving recess shown in FIG. 2, respectively.
Figure 4B:
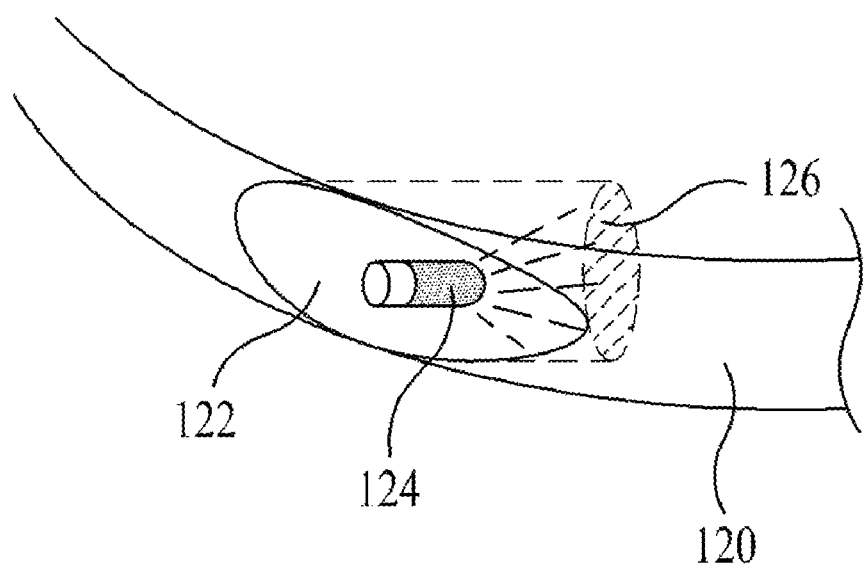
Figure 4C:
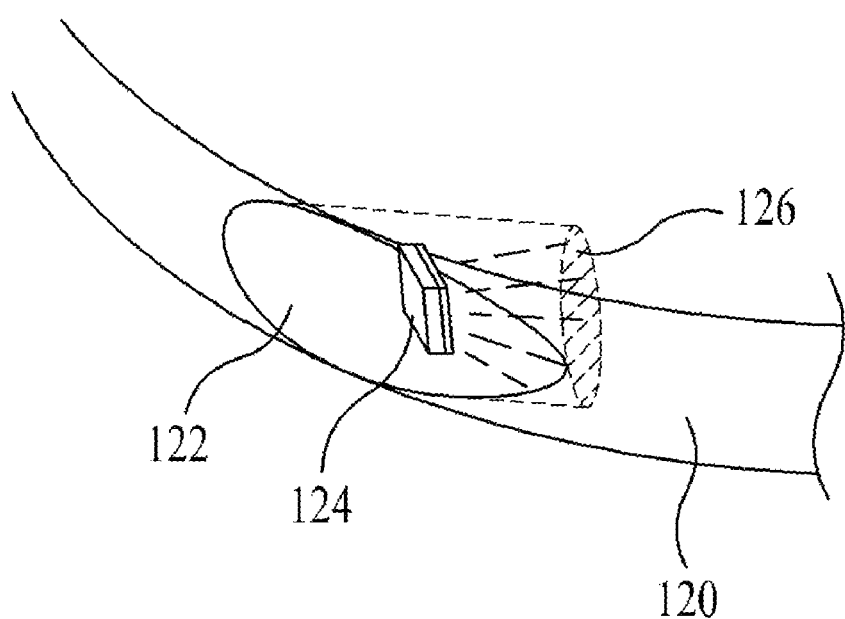
Figure 7:
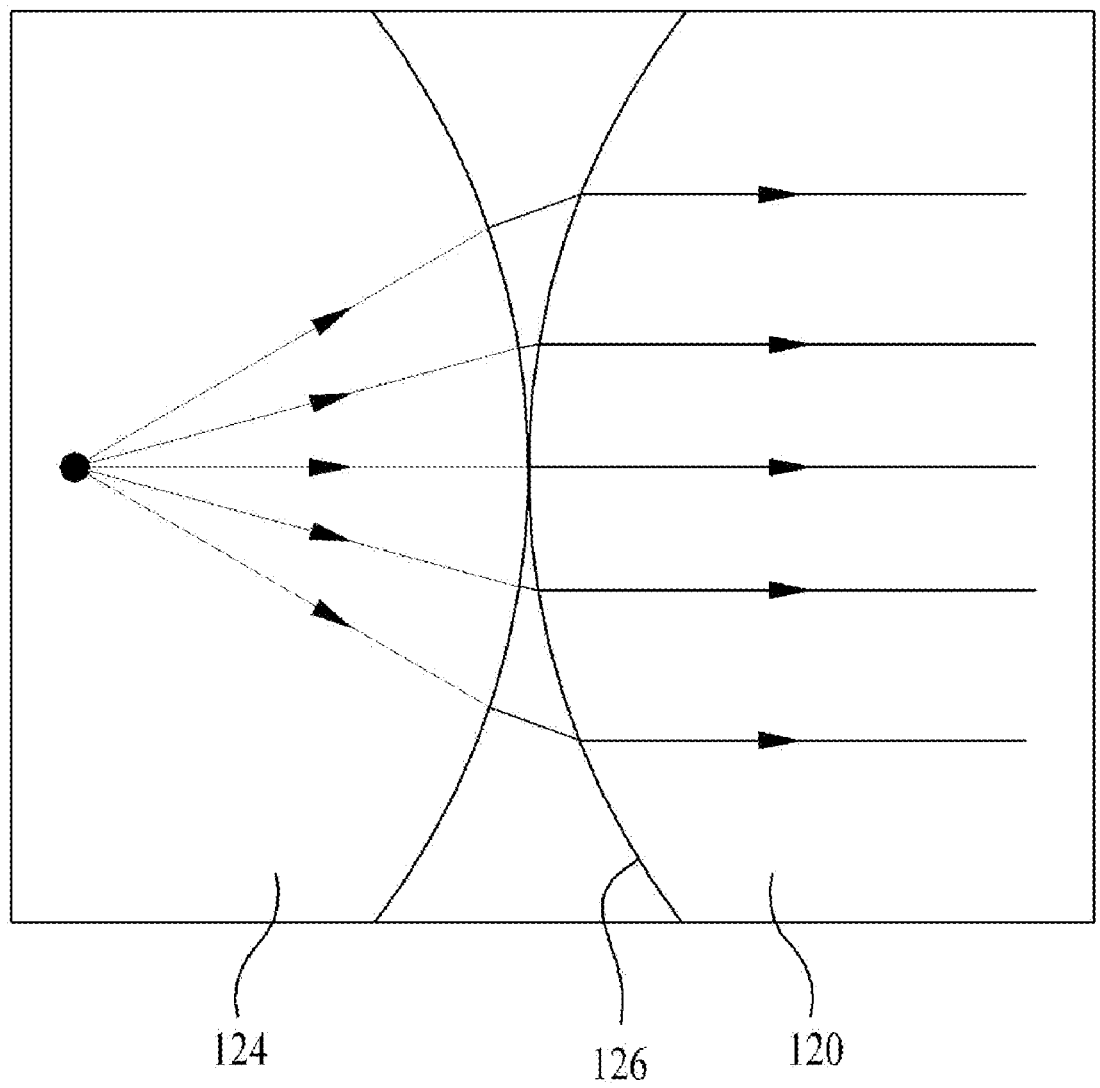
FIG. 7 illustrates a section provided for explaining a travel path of a light from the light emission diode in FIG. 3 or 4 toward a light receiving portion.

Referring to FIG. 3, the light receiving portion 120 receives a light from a light emission diode 124. For this, the light receiving portion 120 has a side surface having a plurality of light receiving recesses 122 each with a light emission diode 124 placed therein. In this instance, as shown in FIG. 4A (FIG. 4A illustrates a diagram showing a state before the light emission diode 124 is placed in the light receiving recess 122) the light receiving recess 122 has a size the same with the light emission diode 124 (W1=W2), or, as shown in FIGS. 4B and 4C, greater than the light emission diode 124. Moreover, as shown in FIGS. 4A and 4B, the light emission diode 124 placed in the light receiving recess 122 is a package type light emission diode 124 having a lead, or as shown in FIG. 4C, a chip form of light emission diode 124. Furthermore, as shown in FIGS. 4B and 4C, the light emission diode 124 is formed spaced away from a light incident surface 126 positioned at an innermost side of the light receiving recess 122, or, as shown in FIG. 7, is formed in contact with the light incident surface 126.

Thus, since the light emission diode 124 is positioned at a side surface of the light receiving portion 120 such that the light enters from the light emission diode 124 into the color mixing lens 110 and travels along a helix, the color mixing lens of the present invention can mix colors within a relatively low height, enabling to reduce a height of the color mixing portion 130 compared to a related art color mixing structure which has the light emission diode at a lower part of a bottom surface of the light receiving portion.

Figure 5:
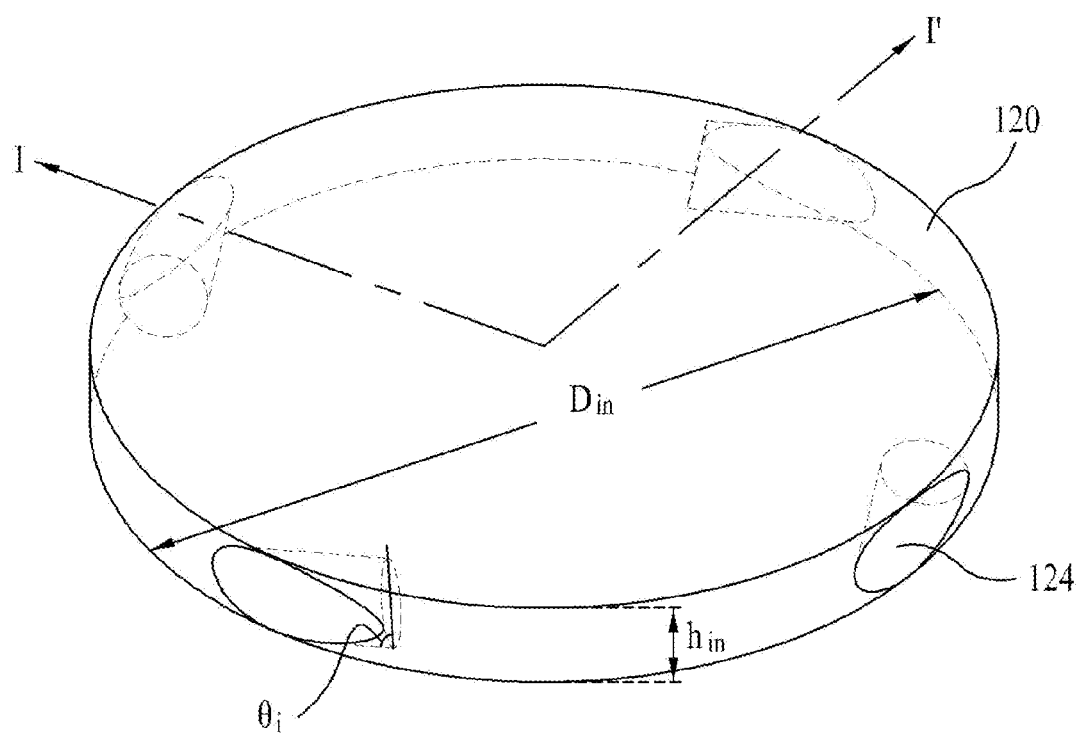
FIG. 5 illustrates a diagram of the light receiving portion shown in FIG. 2 or 3 in detail.
Figure 5:
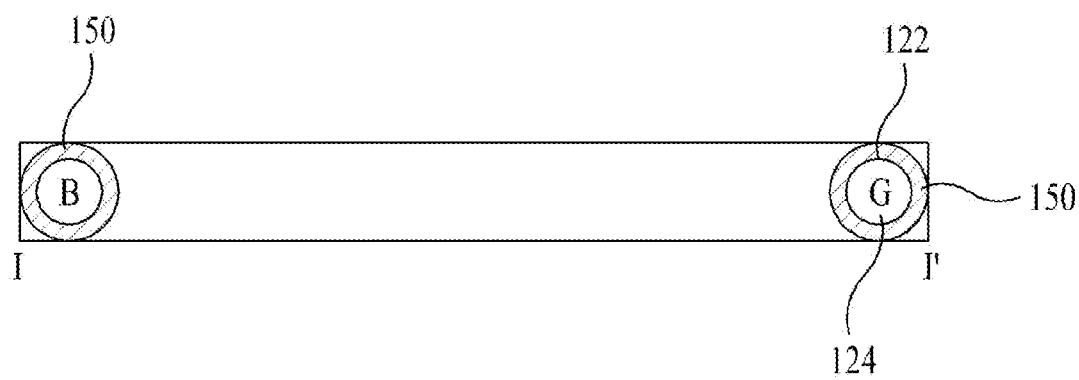

Referring to FIG. 5, the light receiving portion 120 is a circular column having a diameter $D_{in}$ and a height $H_{in}$ of a material having a low light absorption ratio, such as PMMA (Polymethyl Methaacrylate), PC (Polycarbonate) or PET (Polyethylene terephthalate).

At least two light emission diodes 124 which emit lights of colors different from each other are placed in the plurality of the light receiving recesses 122, respectively. For an example, the plurality of the light receiving recesses 122 may be three for placing the red R, the green G and the blue light emission diodes 124 therein respectively, or four for placing two green G light emission diodes 124, one red R light emission diode 124 and one blue light emission diodes 124 therein respectively, taking light emission efficiencies into account. In the meantime, numbers of the light emission diodes 124 and the light receiving recesses 122 are not limited to 3 or 4, but may vary with optical characteristics.

Figure 6A:
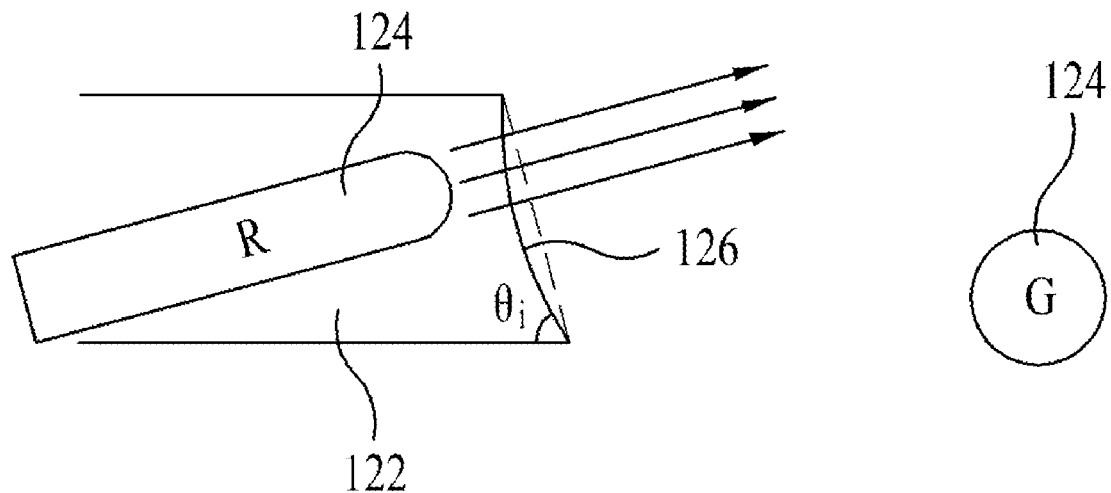
FIGS. 6A and 6B illustrate diagrams provided for explaining a light path according to an angle between a light incident surface of a light receiving portion of the present invention and a horizontal axis.
Figure 6B:
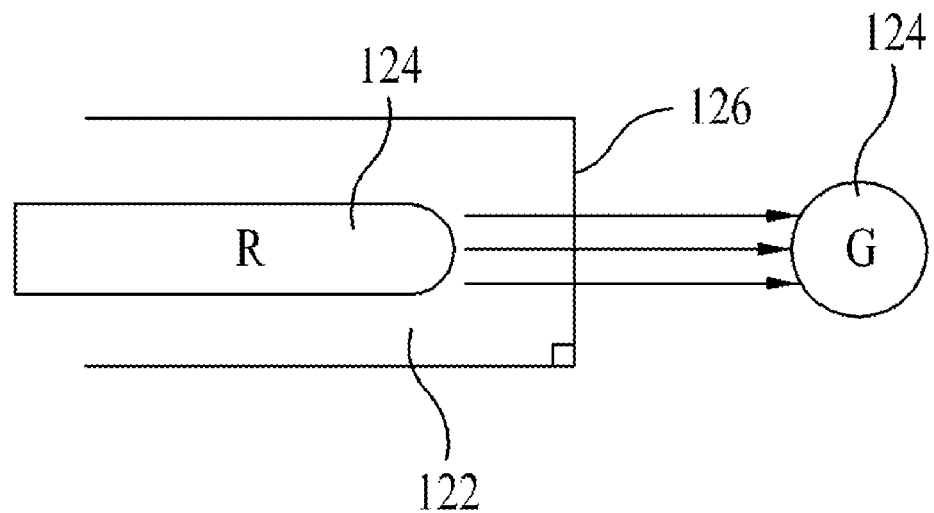

Referring to FIG. 5, the light receiving recess 122 has the light reflective layer 150 formed on an inside surface. In this instance, the light reflective layer 150 is not formed on the light incident surface 126 positioned at the innermost side of the light receiving recess 122. The light reflective layer 150 is formed of a material having a high light reflectivity, such as aluminum, silver, or gold for directing the light from the light emission diode 124 to the color mixing lens 110 without loss. Moreover, the light incident surface 126 of the light receiving portion 120 is formed to face a light emission surface of the light emission diode 124, and as shown in FIGS. 5 and 6A, to be sloped at an angle θi from a horizontal axis for preventing the light emitted from the light emission diode 124 from losing by an adjacent light emission diode 124 and the light receiving recess 122. In detail, as shown in FIG. 6B, if the light incident surface 126 is not sloped (i.e., the slope angle θi=90°), most of the light from the light emission diode 124 travels an unwanted light path by the adjacent light emission diode 124 and the light receiving recess 122, losing the light from an inside of the color mixing lens 110. Opposite to this, as shown in FIG. 6A, if the light incident surface 126 is sloped, since most of the light from the light emission diode 124 does not travel toward the adjacent light emission diode 124 and the light receiving recess 122, the travel of the light toward the unwanted light path by the adjacent light emission diode 124 can be prevented.

Figure 8A:
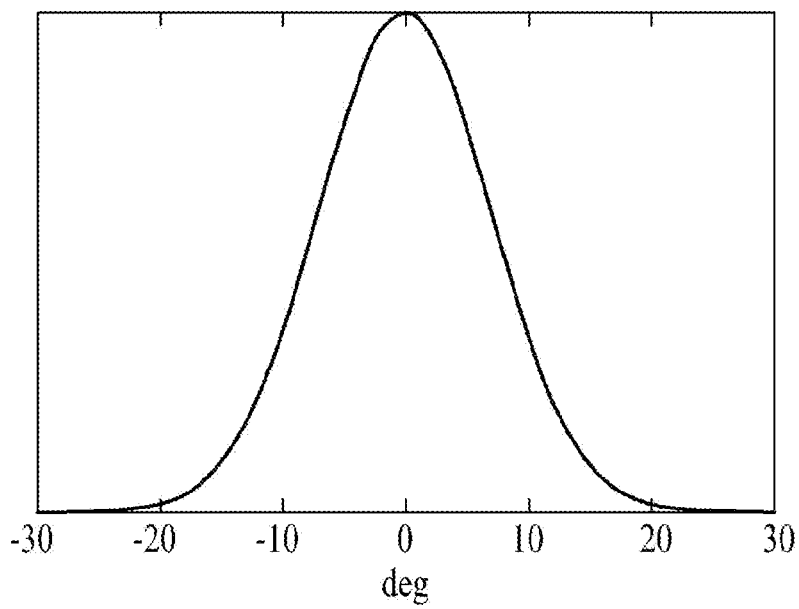
FIGS. 8A and 8B illustrate graphs showing light emission patterns of a light from a light emission diode and a light entered to a light receiving portion, respectively.
Figure 8B:
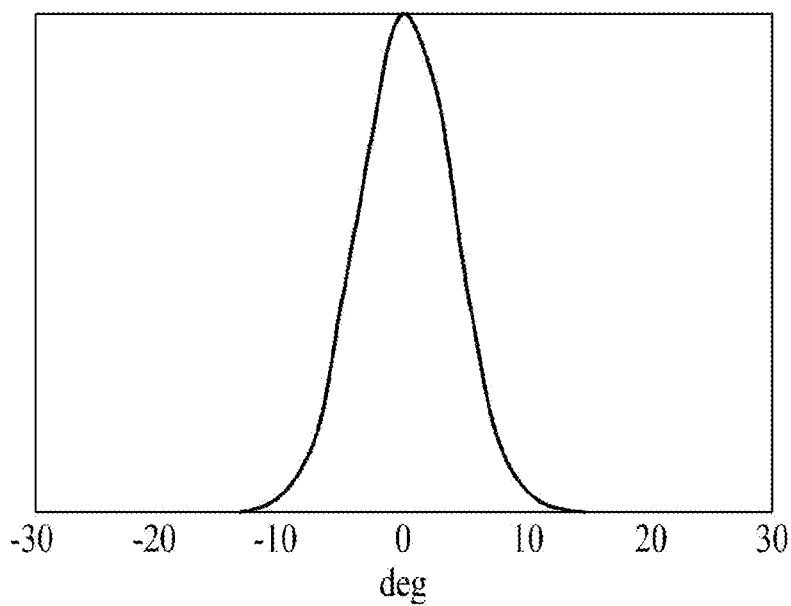

Moreover, referring to FIG. 7, the light incident surface 126 of the light receiving portion 120 positioned at the innermost side of the light receiving recess 122 has a curvature. The light from the light emission diode 124 is collimated at the light incident surface 126 at entering into the light receiving portion 120. For an example, while the light from the light emission diode 124 has a half width at half maximum of 20 degrees as shown in FIG. 8A, the light entered into the light receiving portion 120 through light incident surface 126 from the light emission diode 124 has a half width at half maximum of 10 degrees as shown in FIG. 8B. Thus, it can be known that the light entered to the light receiving portion 120 through the light incident surface 126 having the curvature is collimated.

Figure 9:
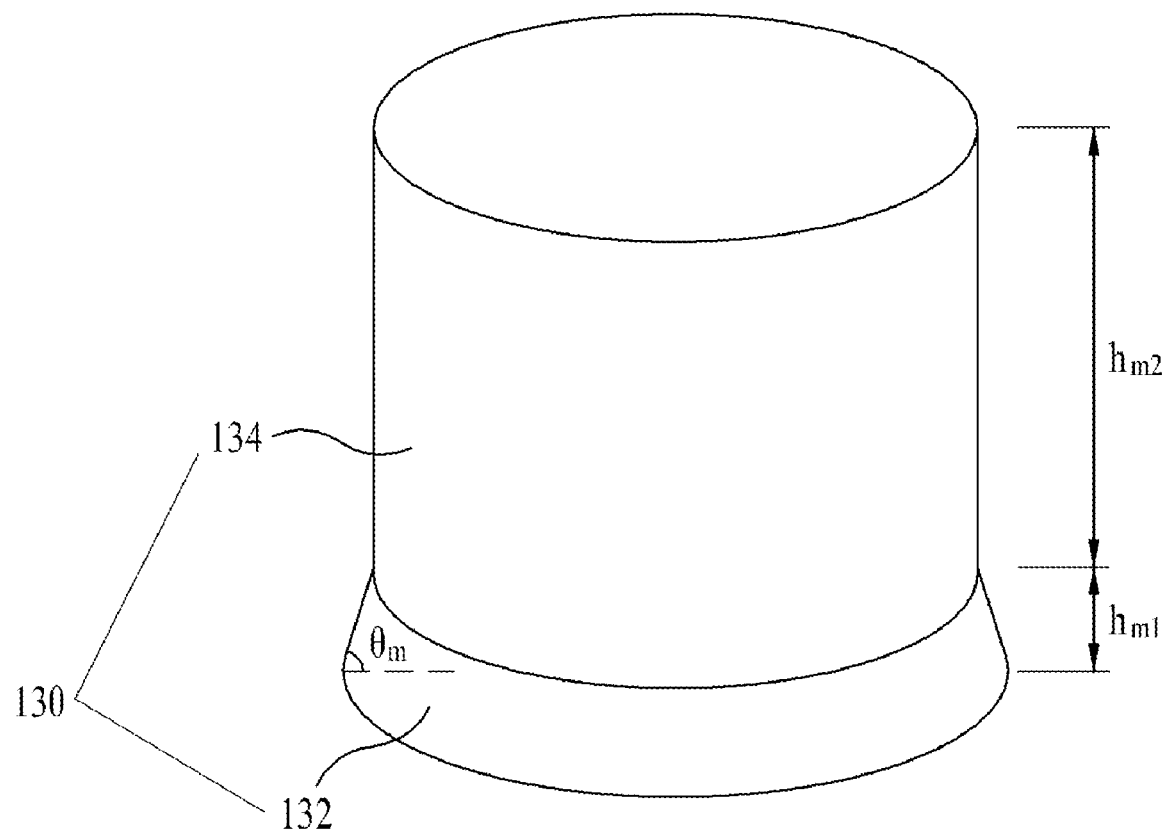
FIG. 9 illustrates a perspective view of the color mixing portion in FIG. 2 or 3.

Referring to FIG. 9, the color mixing portion 130 includes a first mixing portion 132 formed on the light receiving portion 120, and a second mixing portion 134 formed on the first mixing portion 132. The color mixing portion 130 is formed on the light receiving portion 120 of a material having a low light absorption ratio, such as PMMA (Polymethyl Methaacrylate), PC (Polycarbonate) or PET (Polyethylene terephthalate). The color mixing portion 130 is formed of material the same, and as one unit, with the light receiving portion 120 or individually.

The first mixing portion 132 adjusts directions of travel of the lights such that the red, green and blue lights entered through the light receiving portion 120 can be mixed at a low height. Since the first mixing portion 132 is formed to have a width to become the smaller gradually as the height goes from a lower part to an upper part, the first mixing portion 132 has a sloped surface.

The second mixing portion 134 has no sloped surface, mixes the light from the first mixing portion 132 and directs the light to the light emission portion 140.

Figure 10A:
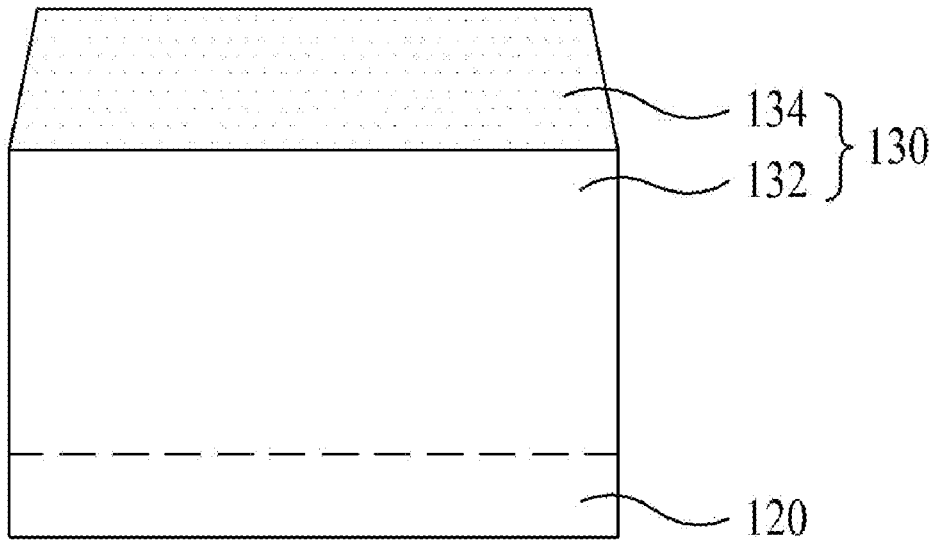
FIGS. 10A~10C illustrate diagrams each showing a variation of the color mixing portion in FIG. 9, respectively.
Figure 10B:
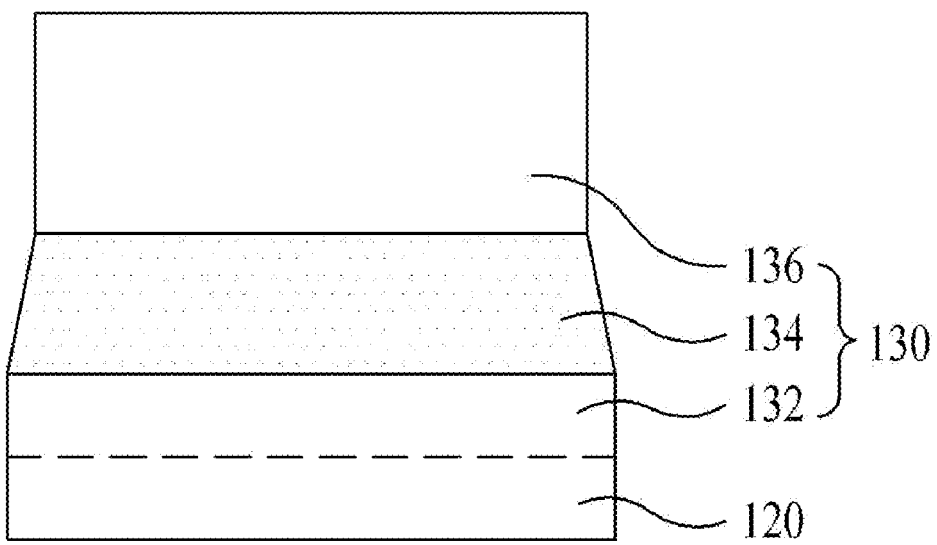
Figure 10C:
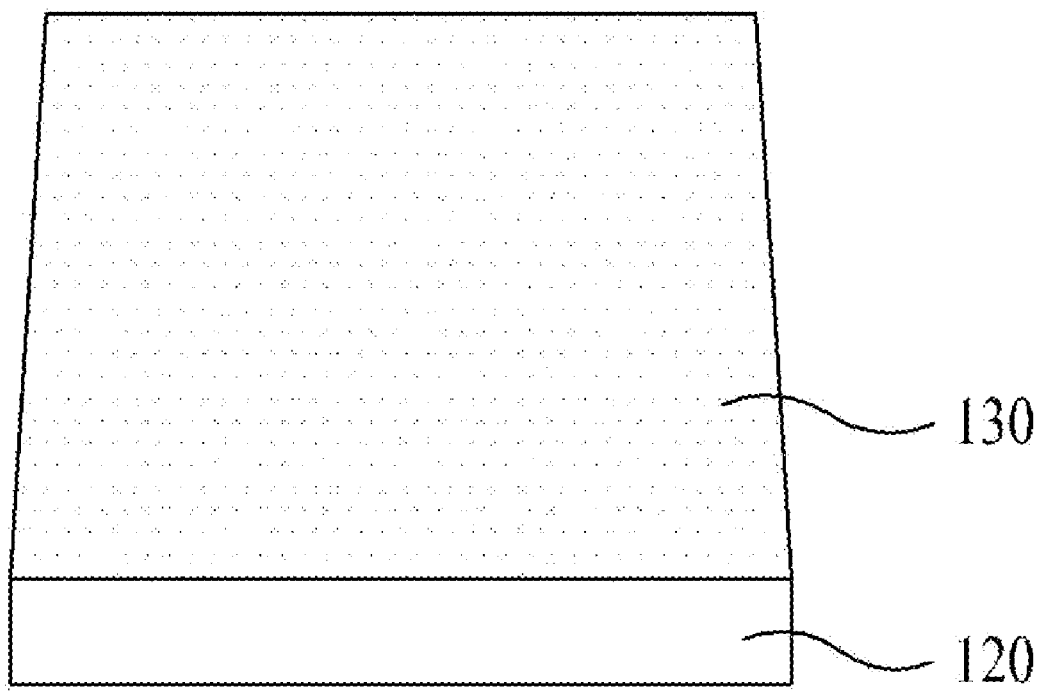

In the meantime, even though the color mixing portion 130 has been described, taking an example in which the first mixing portion 132 has a sloped surface and the second mixing portion 134 has no sloped surface, other than this, the color mixing portion 130 may have any one of structures shown in FIGS. 10A to 10C. The color mixing portion 130 shown in FIG. 10A includes the first mixing portion 132 having a line width the same with the light receiving portion 120 without the sloped surface, and the second mixing portion 134 formed on the first mixing portion 132 to have a sloped surface. The color mixing portion 130 shown in FIG. 10B includes the first mixing portion 132 having a line width the same with the light receiving portion 120 without the sloped surface, the second mixing portion 134 formed on the first mixing portion 132 to have a sloped surface, and a third mixing portion 136 formed on the second mixing portion 134 to have no sloped surface. The color mixing portion 130 shown in FIG. 10C is formed to have a sloped surface throughout the color mixing portion 130.

Thus, the lights entered into the color mixing lens 110 and traveling a side of an inside of the color mixing portion 130 satisfy a total reflection condition so as to be mixed adequately in the color mixing portion 130 which has a relatively low height.

The light emission portion 140 emits a white light from the color mixing portion 130 to an outside of the color mixing lens 110. The light emission portion 140 is formed on the color mixing portion 130 of a material having a low light absorption ratio, such as PMMA (Polymethyl Methaacrylate), PC (Polycarbonate) or PET (Polyethylene terephthalate). The light emission portion 140 is formed as one unit, and the same material, with the light receiving portion 120 or the color mixing portion 130, or individually.

Figure 11:
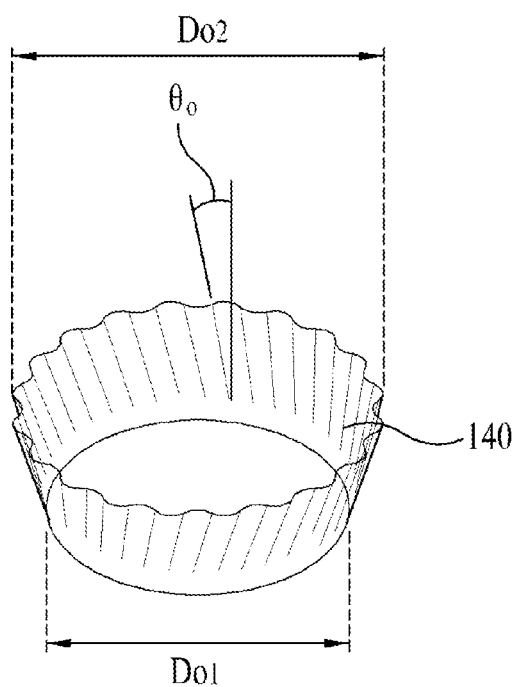
FIG. 11 illustrates a diagram showing the light emission portion in FIG. 2 or 3, in detail.
Figure 11:
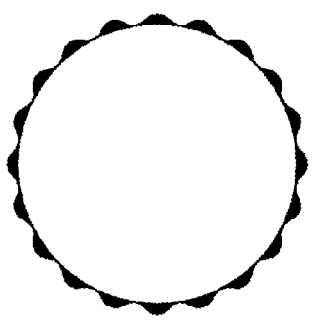
Figure 11:
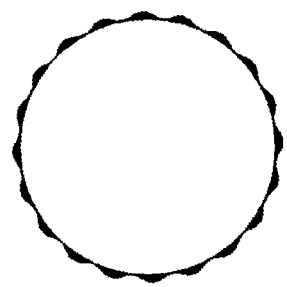
Figure 11:
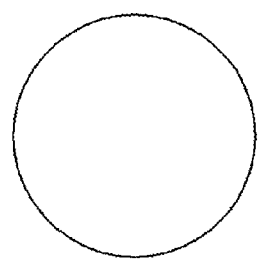

Referring to FIG. 11, the light emission portion 140 is formed to have a wave pattern which has a depth that becomes the deeper as a height of the wave pattern goes from a lower part to an upper part the more. The light emission portion 140 has an upper part diameter $D_{o2}$ formed greater than a lower part diameter $D_{o1}$. The wave patterned light emission portion 140 can scatter the white light traveling on a helix along a side surface of the color mixing portion 130, inwardly.

Moreover, the wave pattern is formed to be twisted at a predetermined angle $\theta_o$ for directing the light the top surface of the light emission portion 140 while mixing the lights. In this instance, the light emission portion 140 is twisted in a direction of arrangement of the light emission diodes 24. For an example, if light emission surfaces of a plurality of the light emission diodes 24 are arranged in a counter clockwise direction as shown in FIG. 2, the wave pattern of the light emission portion 140 is formed to be twisted in the counter clockwise direction as shown in FIG. 11. If the light emission surfaces of a plurality of the light emission diodes 24 are arranged in a clockwise direction, the wave pattern of the light emission portion 140 is formed to be twisted in the clockwise direction.

In the meantime, though twisting of the wave pattern is described taking an example in which the wave pattern of the light emission portion 140 is twisted in a direction of arrangement of the light emission diodes 24, other than this, the wave pattern of the light emission portion 140 can be twisted in a direction opposite to the direction of arrangement of the light emission diodes 24 at user's option.

Since the light emission portion 140 has the light reflective layer 150 formed on portions except the top surface of the light emission portion 140 of a metal having high light reflectivity, such as aluminum, silver and gold, the light emission portion 140 can minimize light loss to be caused by the wave pattern.

Figure 12A:
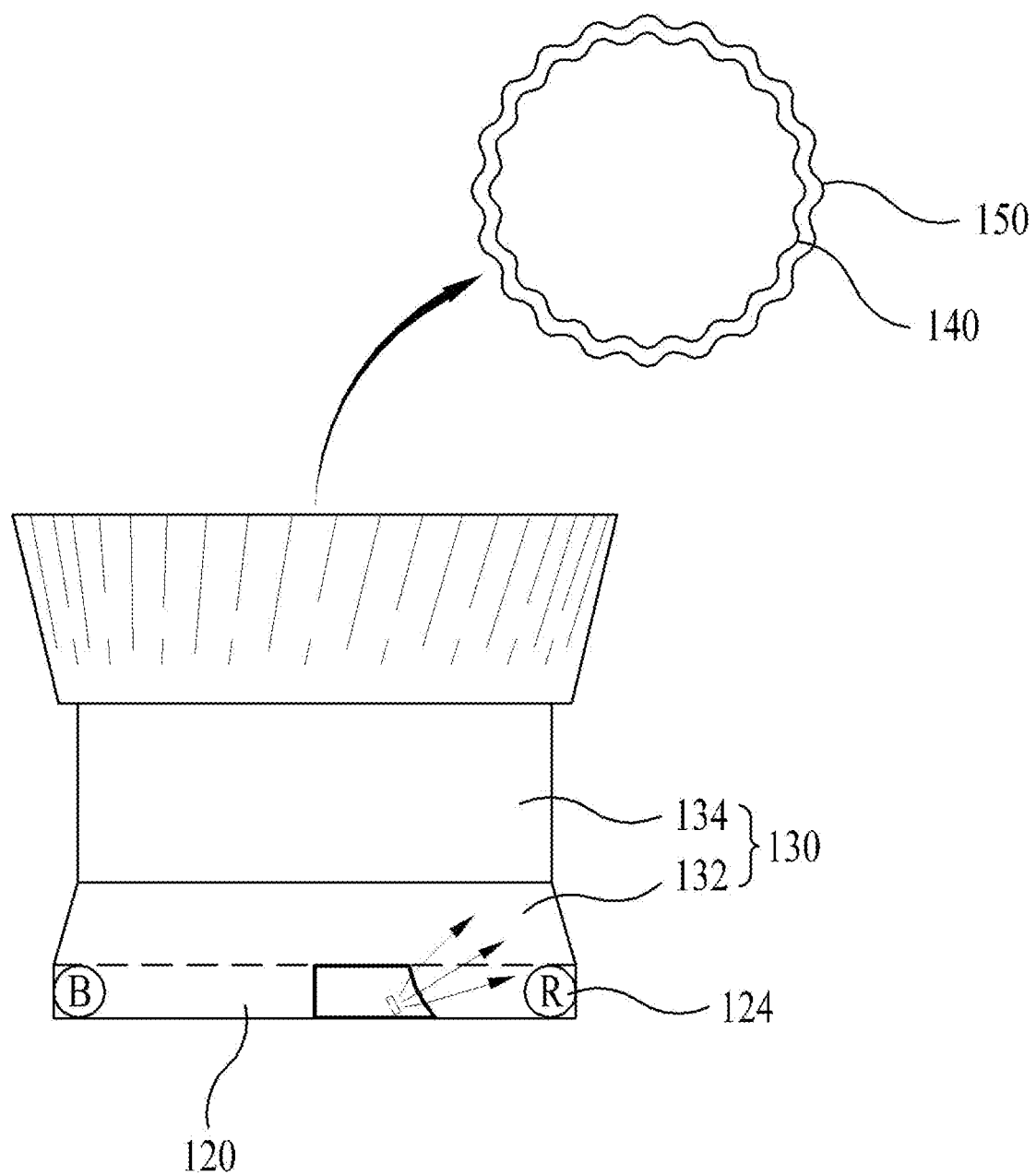
FIGS. 12A and 12B diagrams each showing a variation of the light reflective layer in FIG. 1.
Figure 12B:
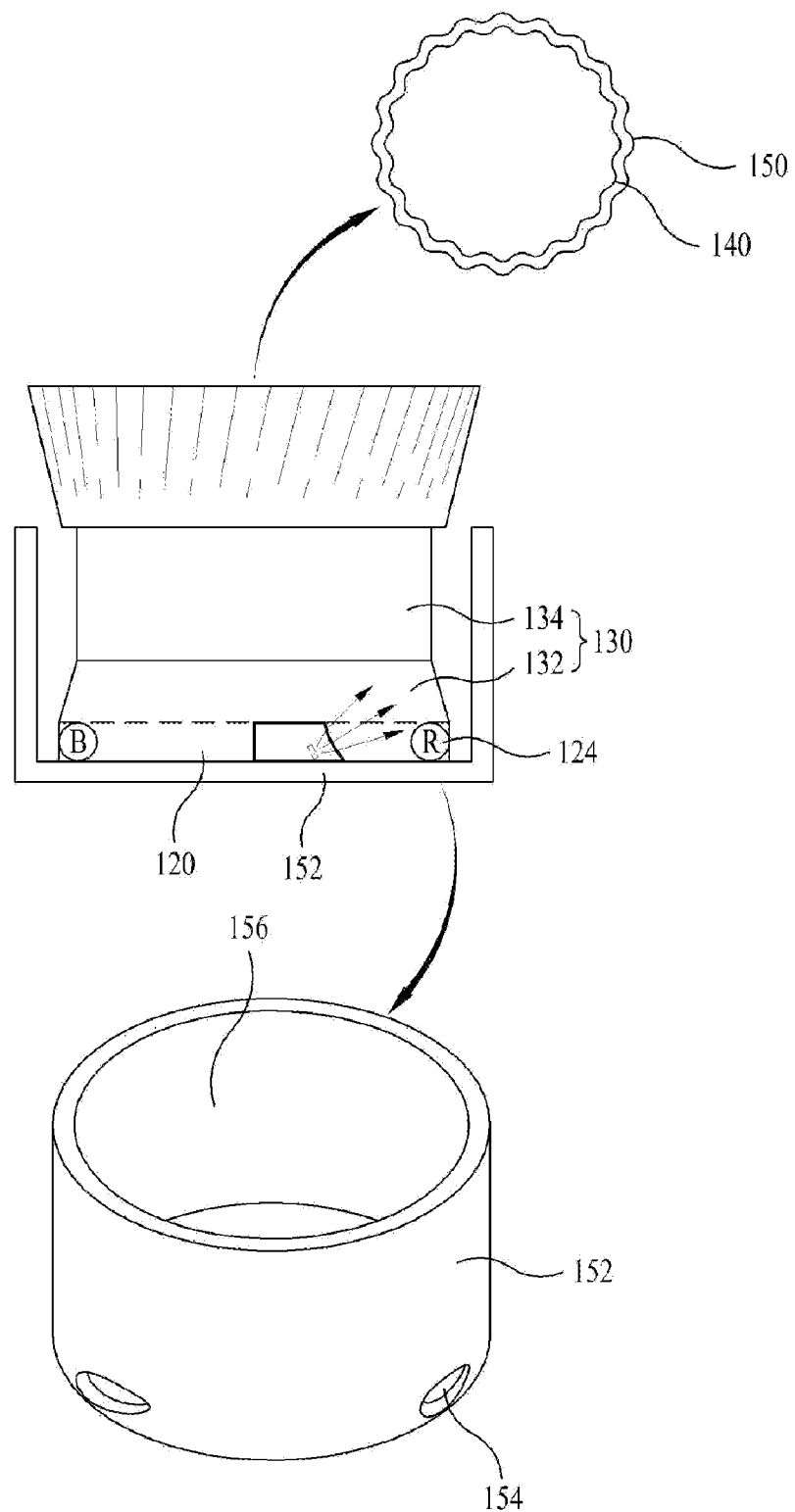

In detail, the light reflective layer 150 is formed to have any one of the structures shown in FIGS. 1, 12A and 12B.

Referring to FIG. 1, the light reflective layer 150 is formed on regions excluding the top surface of the light emission portion 140, and on regions of the light receiving portion 120 excluding the light incident surface 126 of the light receiving portion 120, and the color mixing portion 130 by coating. The light reflective layer 150 has pass through holes 154 at regions overlap with the light receiving recesses 122 of the light receiving portion 120, respectively. The pass through hole 154 is used as a passage of the light emission diode 124 placed in the light receiving recess 122, and a wire (not shown) for connecting a light source substrate (not shown) to the light emission diode 124 for supplying a driving signal to the light emission diode 124.

Referring to FIG. 12A, the light reflective layer 150 is formed on the light receiving portion 120 excluding the light incident surface 126, and the side surface of the light emission portion 140 excluding the top surface thereof by coating. This is because formation of no light reflective layer 150 both on the light receiving portion 120 and the color mixing portion 130 does not matter as far as the light receiving portion 120 and the color mixing portion 130 satisfy the total reflection condition since a quantity of the light lost from the light receiving portion 120 and the color mixing portion 130 is small. Moreover, since the light reflective layer 150 shown in FIG. 12A is not formed on the light receiving portion 120 and the color mixing portion 130, the lights passing through the light receiving portion 120 and the color mixing portion 130 does not come into contact with the light reflective layer 150. According to this, the light traveling the light receiving portion 120 and the color mixing portion 130 while satisfying the total reflection condition is not lost owing to prevention of light absorption by the light reflective layer 150.

Referring to FIG. 12B, the light reflective layer 150 is formed on the light receiving recess 122 excluding the light incident surface 126 of the light receiving portion 120, and the side surface of the light emission portion 140 by coating. Moreover, a light reflective structure 152 in FIG. 12B is formed to surround the light receiving portion 120 and the color mixing portion 130 in a state the light receiving portion 120 and the color mixing portion 130 are spaced from the light reflective structure 152. Since the light reflective structure 152 is spaced from the light receiving portion 120 and the color mixing portion 130 thus, the light traveling the light receiving portion 120 and the color mixing portion 130 while satisfying the total reflection condition does not come into contact with the light reflective structure 152, preventing the light reflective structure 152 from absorbing the light, thereby preventing the light from losing. Moreover, the light reflective structure 152 formed to surround the light receiving portion 120 and the color mixing portion 130 fails to satisfy the total reflection condition to reflect the light emitted from the color mixing lens 110, making the light to re-enter into the color mixing lens 110, thereby improving optical efficiency.

In the meantime, the light reflective structure 152 has pass through holes 154 formed in a region overlapped with the light receiving recess 122 of the light receiving portion 120, and a housing hole 156 formed greater than a greatest diameter of the light receiving portion 120 and the color mixing portion 130 for housing the color mixing portion 110. In this instance, the pass through holes 154 in the light reflective structure 152 are used as passages of lines (not shown) for connecting the light emission diodes 124 placed in the light receiving recesses 122 to a light source substrate (not shown) for supplying a driving signal to the light emission diodes 124. Moreover, alike the light reflective layer 150, the light reflective structure 152 is formed of a metal having high reflectivity, such as aluminum, silver, or gold.

In the meantime, since the color mixing lens 110 of the present invention emits the light from the top surface of the light emission portion 140, in order to make uniform emission of the light converged to the top surface of the light emission portion 140 to an outside of the light emission portion 140, the diffusion sheet (See 160 in FIG. 1) is formed on the light emission portion 140. The diffusion sheet 160 is formed to have the same size and shape with the top surface of the light emission portion 140, or have an area larger than the top surface of the light emission portion 140 and the same or different shape from the light emission portion 140.

Table 1 shows a result of simulation of the color mixing lens 110 of the present invention. The values shown in table 1 are values only of the embodiment, but do not limit the values and may vary at user's option.

TABLE 1

|  | Parameters | Values |
|---|---|---|
| Light receiving portion | Entire diameter($D_{in}$) | 10 mm |
|  | Entire height($H_{in}$) | 1 mm |
|  | Slope angle($\theta_i$) | 80 deg. |

TABLE 1-continued

|  | Parameters | Values |
|---|---|---|
| Color mixing portion | Focal length of parabolic light receiving surface | 1.5 mm |
|  | Diameter of light receiving recess | 1 mm |
|  | Height of first mixing portion($h_{m1}$) | 1 mm |
|  | Height of first mixing portion($h_{m2}$) | 4.5 mm |
|  | Lower part diameter of first mixing portion | 10 mm |
|  | Upper part diameter of second mixing portion | 9.825 mm |
|  | Slope angle($\theta_m$) | 85 deg. |
| Light emission portion | Entire height($h_o$) | 3.5 mm |
|  | Lower part diameter($D_{o1}$) | 9.825 mm |
|  | Upper part diameter($D_{o2}$) | 10.5 cm |
|  | Upper part wave pattern diameters | 0.7 mm |
|  | Twist angle($\theta_o$) | 8 deg. |
| Color mixing lens | Total height ($H_{in} + h_{m1} + h_{m2} + h_o$) | 1 cm |

Figure 13:
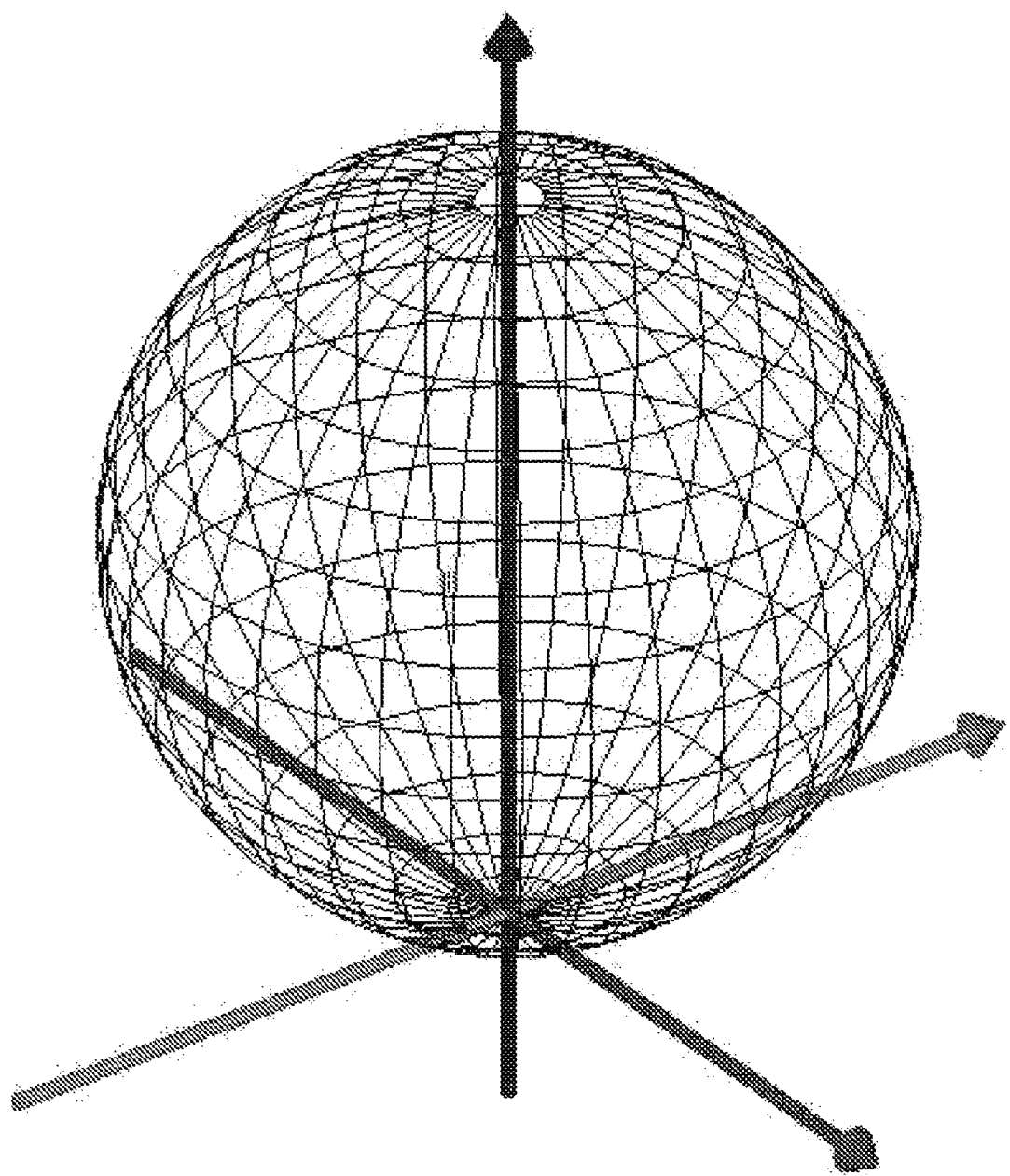
FIG. 13 illustrates a diagram of a light emission pattern of a color mixing lens according to a diffusion sheet.

FIG. 13 illustrates a result of application of the diffusion sheet 160 having a uniform bidirectional transmittance distribution function and a bidirectional reflectance distribution function of a specular reflection component to the color mixing lens 110, wherefrom it can be known that the color mixing lens of the present invention emits the light from the top surface.

The color mixing lens 110 of the present invention has characteristics of 85.1% of efficiency, 77.1% of illumination uniformity and 0.04134 of color uniformity, wherein the efficiency is a ratio of a light beam emitted to an outside of the light emission portion 140 after colors are mixed to a light beam received at the light receiving portion 120, the illumination uniformity is a ratio of a minimum value to a maximum value of illumination data, and the color uniformity is a relative standard deviation of chromaticity.

The color mixing lens 110 having the diffusion sheet 160 with a uniform bidirectional transmittance distribution function and a bidirectional reflectance distribution function of a specular reflection component applied thereto has excellent optical characteristics in efficiency, color uniformity, and illumination uniformity, especially, has greater than 70% of efficiency, and illumination uniformity, respectively.

According to this, it can be known that the color mixing lens 110 of the present invention mixes the red, green and blue lights from the red, green and blue light emission diodes 124 into a white color light well and emits the white color light from the top surface of the color mixing lens 110.

Figure 14:
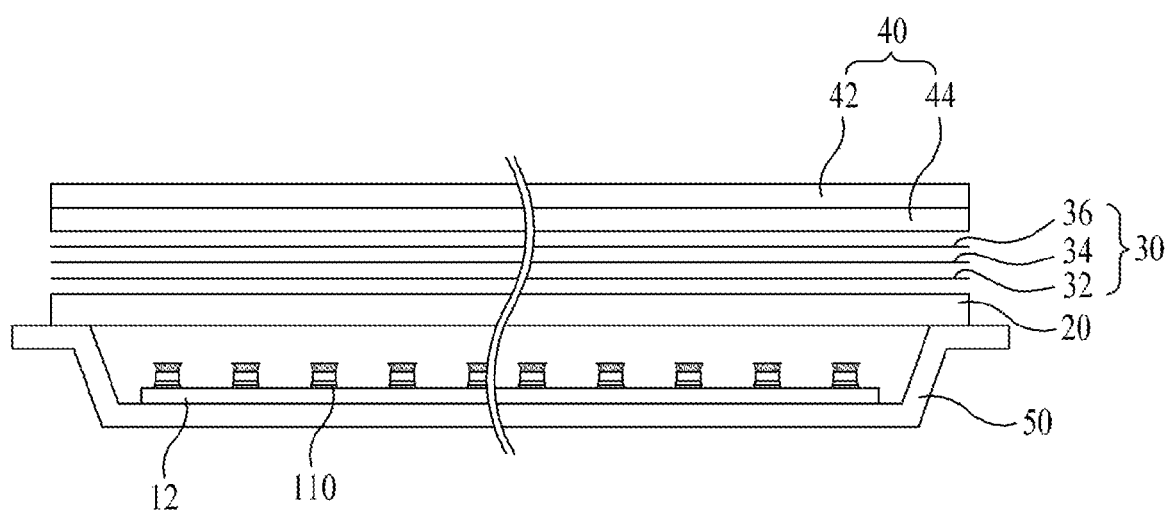
FIG. 14 illustrates a section of a liquid crystal display device having the color mixing lens used as a light source.

Referring to FIG. 14, the color mixing lens 110 is used as a light source of a backlight unit in a liquid crystal display device.

The liquid crystal display device having the color mixing lens 110 of the present invention applied thereto includes a liquid crystal panel 40 which controls light transmissivity of liquid crystals according to a picture data for displaying an image, a backlight unit including a plurality of color mixing lens 110 for directing a light to the liquid crystal panel 40, and a bottom cover 50 for mounting the backlight unit thereto.

The liquid crystal panel 40 includes a thin film transistor substrate 44 and a color filter substrate 42 bonded opposite to each other, spacers for maintaining a cell gap between the two substrates 42 and 44, and liquid crystals filled in a space formed by the spacers.

The backlight unit which supplies the light to the liquid crystal panel 40 includes a plurality of color mixing lenses 110, a diffusion plate 20 for diffusing the light from the plurality of color mixing lenses 110, and a plurality of optical sheets for polarizing, converging and diffusing the light from the diffusion plate 20.

The color mixing lens 110, formed in a shape of a chip, is mounted on the light source substrate 12.

The light is incident on the diffusion plate 20 from the color mixing lens 110. The diffusion plate 20 directs the light from the plurality of color mixing lenses 110 to a front of the liquid crystal panel 40, diffuses the light to have uniform distribution and illuminates the liquid crystal panel 40. The diffusion plate 20 has a film of transparent resin coated with a light diffusing member on both sides thereof.

The light from the diffusion plate 20 forms a large angle of view owing to light diffusion. The light incident on the liquid crystal panel 40 shows best efficiency when the light is incident onto the liquid crystal panel 40, perpendicularly. To do this, a plurality of optical sheets 30 is arranged on the diffusion plate 20. The plurality of optical sheets 30 turns a direction of the light from the diffusion plate 20 to be vertical to the liquid crystal panel for improving the optical efficiency. Accordingly, the light is incident on the liquid crystal panel 40 from the diffusion plate 20 through the plurality of optical sheets 30 having a diffusion sheet 32, a converging sheet 34, a polarizing sheet 36, and so on.

In the meantime, though the color mixing lens 110 of the present invention has been described taking an example in which the color mixing lens 110 is applied to a direct lighting type backlight unit, besides this, the color mixing lens 110 can also be applied to an edge type backlight unit. In a case the backlight unit is applied to the edge type backlight unit, the top surface of the light emission portion 140 is formed to face a light incident surface of the light plate.

As has been described, the color mixing lens and a liquid crystal display device having the same of the present invention have the following advantages.

The application of red, green and blue light emission diodes improves color reproducibility and light emission efficiency. And the color mixing lens of the present permits to fabricate a slim liquid crystal display device and a light emission pattern of a light emission device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A color mixing lens comprising:
a light receiving portion having at least two light emission diodes positioned at a side surface for emitting lights of colors different from each other and light receiving recesses for placing the light emission diodes therein respectively;
a color mixing portion formed on the light receiving portion for mixing the lights from the light emission diodes into a white color light; and
a light emission portion formed on the color mixing portion for emitting the white light from the color mixing portion through a top surface thereof, wherein a side surface of the light emission portion is formed to have a wave pattern with a depth which becomes the deeper as a height thereof goes from a lower part to an upper part.

2. The color mixing lens as claimed in claim 1, wherein the light receiving recess has a light incident surface positioned therein, which forms an acute angle to a horizontal axis and has a curvature.

3. The color mixing lens as claimed in claim 1, wherein the light receiving recess has a line width greater than a diameter of the light emission diode.

4. The color mixing lens as claimed in claim 1, further comprising a light reflective layer formed on the light receiving portion, the color mixing portion and the light emission portion excluding the light incident surface of the light receiving portion positioned in the light receiving recess and the top surface of the light emission portion.

5. The color mixing lens as claimed in claim 1, further comprising a light reflective layer formed on the light receiving recess excluding the light incident surface of the light receiving portion positioned in the light receiving recess, and the side surface of the light emission portion.

6. The color mixing lens as claimed in claim 1, further comprising:
a light reflective layer formed on the light receiving recess excluding the light incident surface of the light receiving portion positioned in the light receiving recess, and the side surface of the light emission portion; and
a light reflective structure formed to surround the light receiving portion and the color mixing portion in a state the light receiving portion except a portion connected to the light receiving recess of the light receiving portion and the color mixing portion are spaced from the light reflective structure.

7. The color mixing lens as claimed in claim 1, wherein the color mixing portion has a multiple layered structure in which at least one of the multiple layers has a sloped surface which has a width that becomes the smaller as a height thereof goes from a lower part to an upper part the more.

8. The color mixing lens as claimed in claim 1, wherein the color mixing portion has single layered structure which has a sloped surface which has a width that becomes the smaller as a height thereof goes from a lower part to an upper part the more.

9. The color mixing lens as claimed in claim 1, wherein the light emission portion has a diameter which becomes the greater as a height thereof goes from a lower part to an upper part the more.

10. The color mixing lens as claimed in claim 1, wherein the wave pattern is twisted in a direction of arrangement of light emission surfaces of the at least two light emission diodes.

11. The color mixing lens as claimed in claim 1, wherein the wave pattern is twisted in a direction opposite to a direction of arrangement of light emission surfaces of the at least two light emission diodes.

12. The color mixing lens as claimed in claim 1, further comprising a diffusion sheet formed on the top surface of the light emission portion.

13. A liquid crystal display device comprising:
a color mixing lens for emitting a white color light; and
a liquid crystal panel for producing a picture by using the white color light produced from the color mixing lens,
wherein the color mixing lens includes;
a light receiving portion having at least two light emission diodes positioned at a side surface for emitting lights of colors different from each other and light receiving recesses for placing the light emission diodes therein respectively;
a color mixing portion formed on the light receiving portion for mixing the lights from the light emission diodes into a white color light, and
a light emission portion formed on the color mixing portion for emitting the white light from the color mixing portion through a top surface thereof, wherein a side surface of the light emission portion is formed to have a wave pattern with a depth which becomes the deeper as a height thereof goes from a lower part to an upper part.

* * * * *